No. 759,720. PATENTED MAY 10, 1904.
A. KIDDIE.
ELEVATOR.
APPLICATION FILED JAN. 30, 1903.
NO MODEL. 8 SHEETS—SHEET 1.
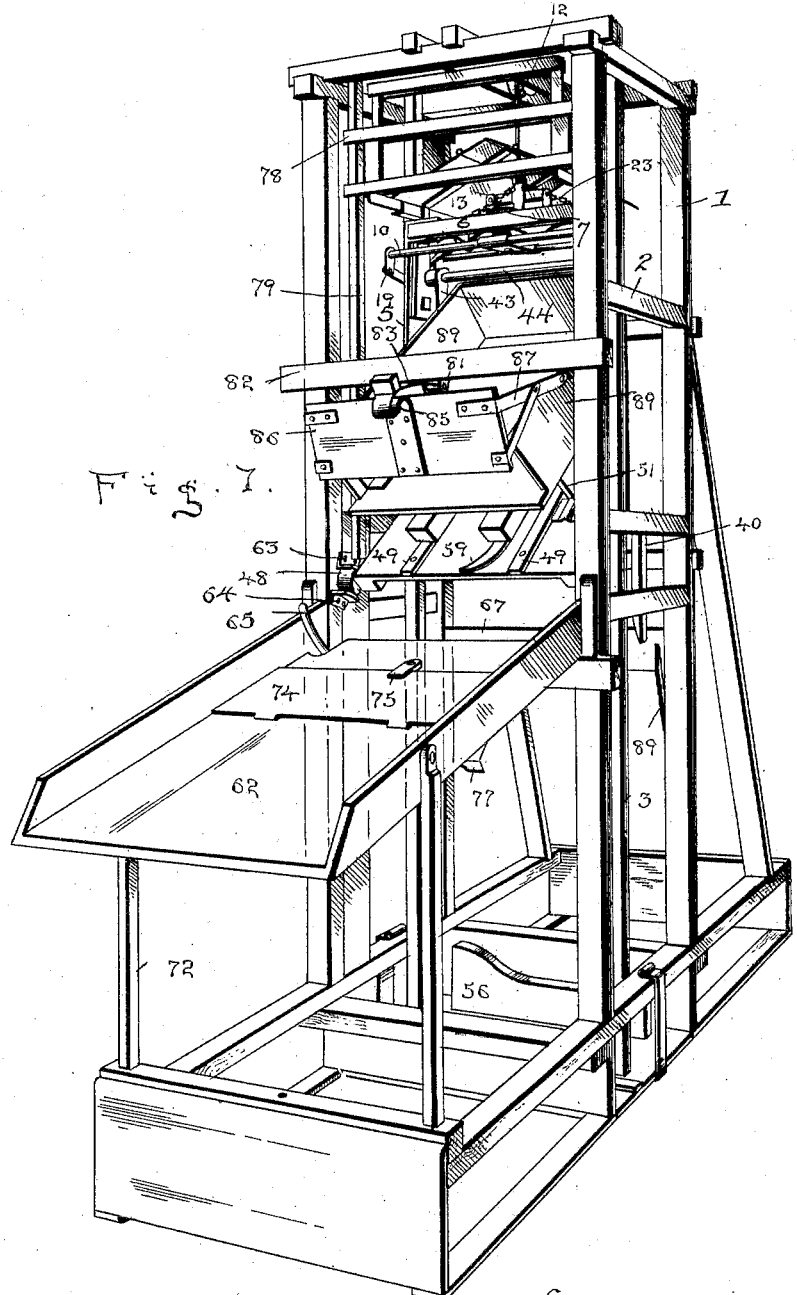

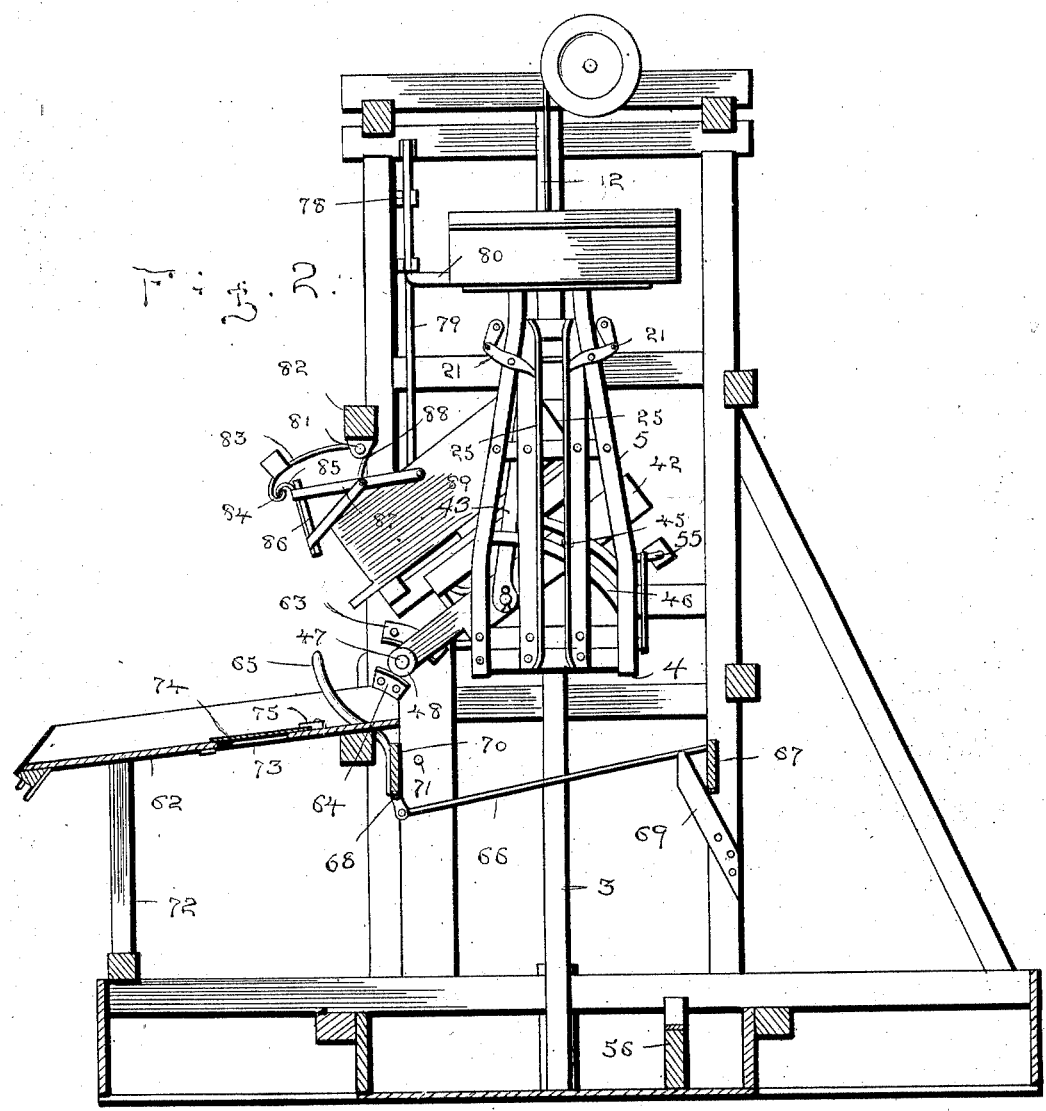

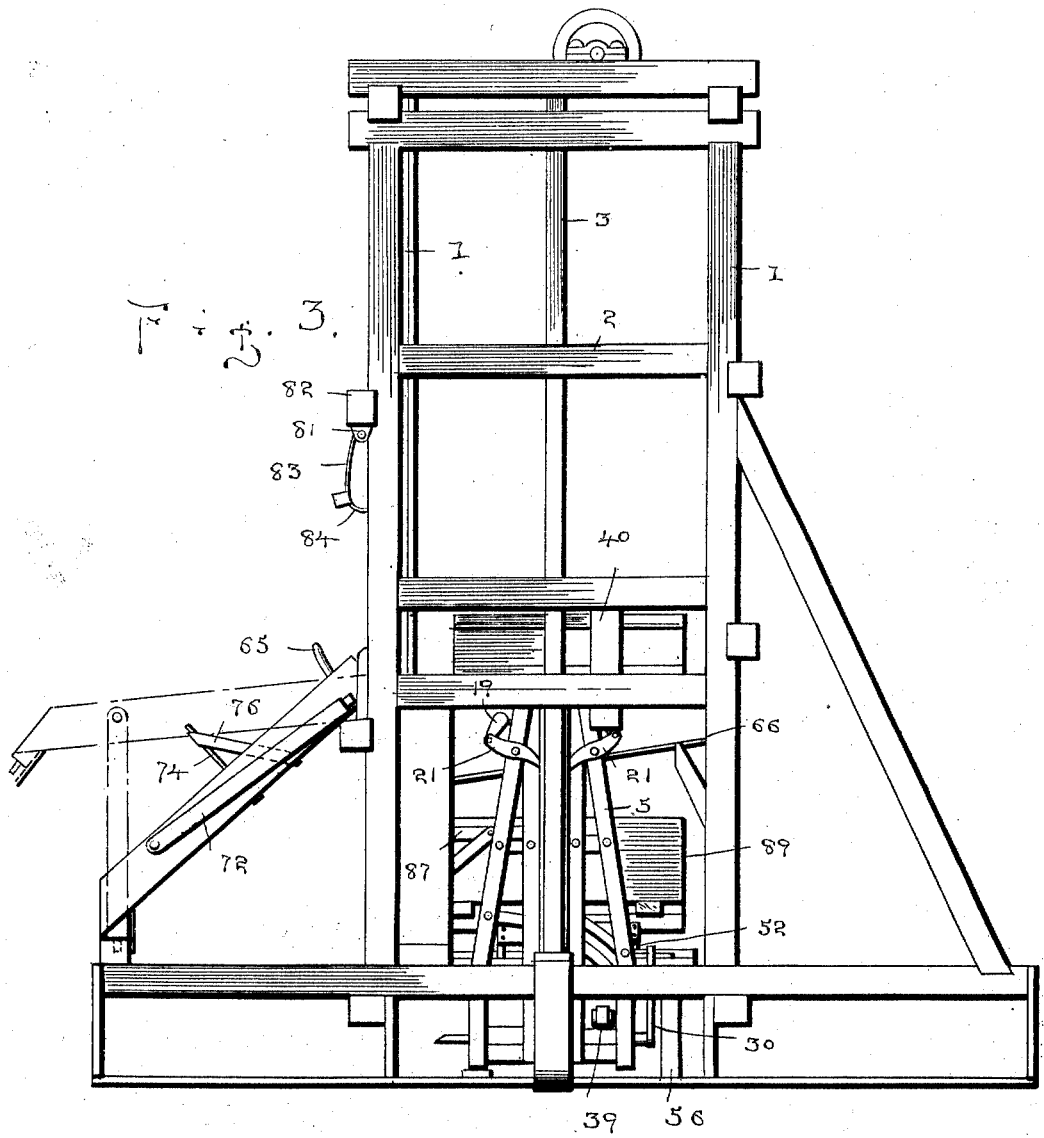

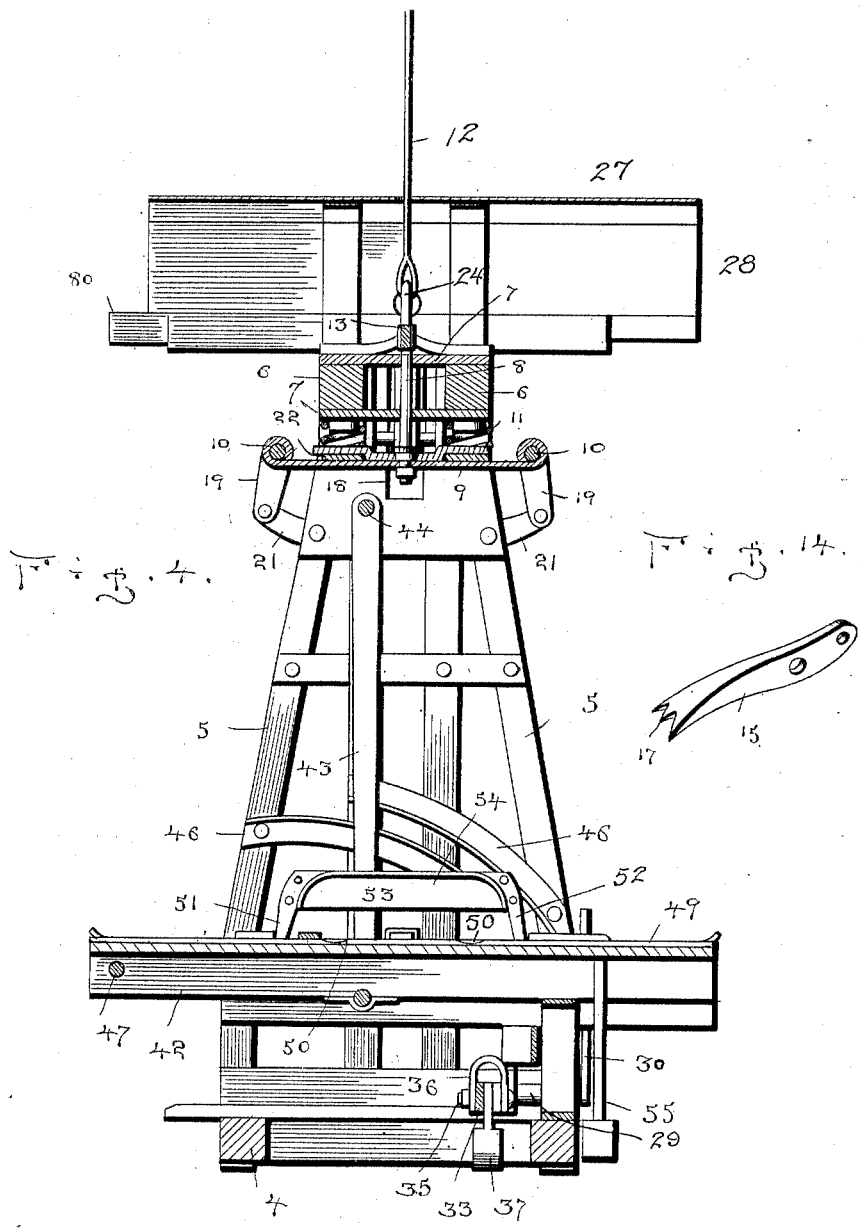

No. 759,720. PATENTED MAY 10, 1904.
A. KIDDIE.
ELEVATOR.
APPLICATION FILED JAN. 30, 1903.
NO MODEL. 8 SHEETS—SHEET 5.
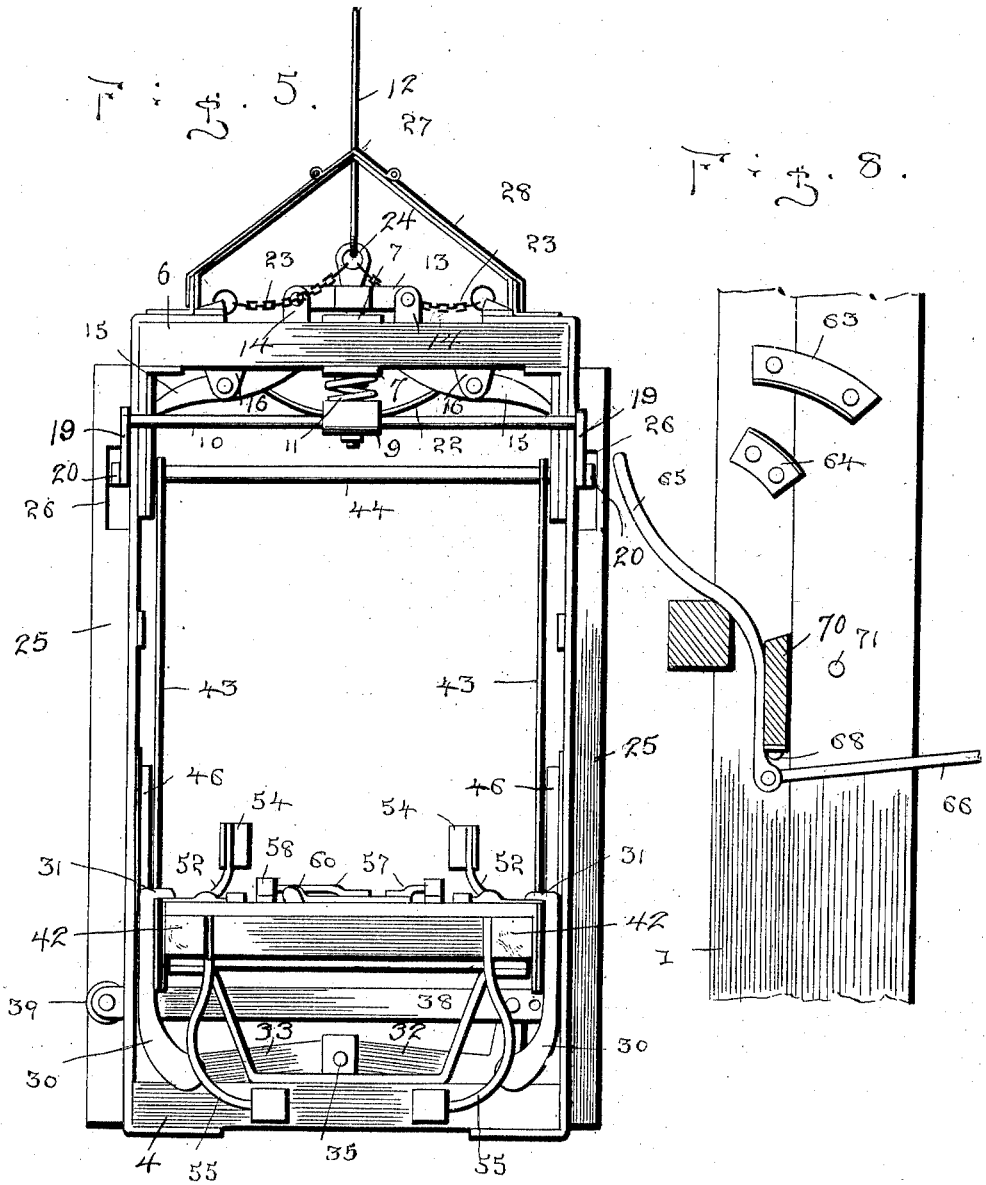

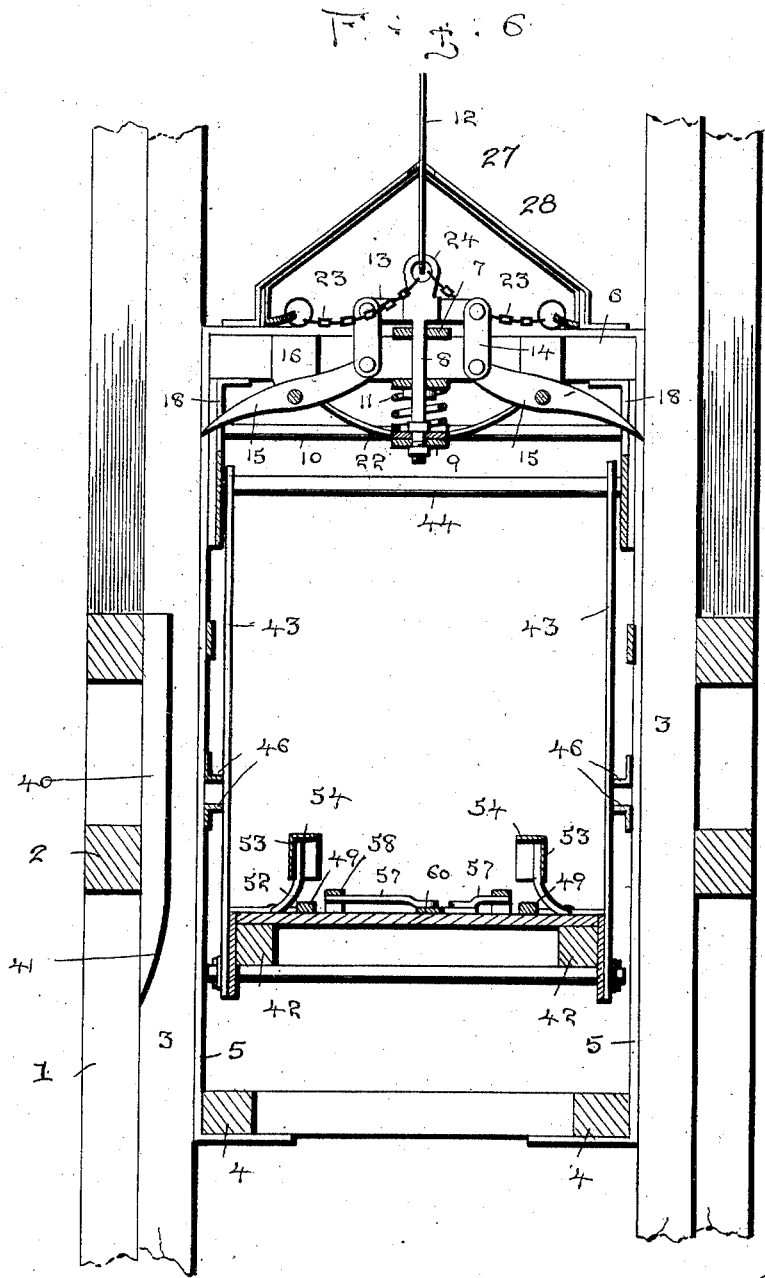

No. 759,720. PATENTED MAY 10, 1904.
A. KIDDIE.
ELEVATOR.
APPLICATION FILED JAN. 30, 1903.
NO MODEL. 8 SHEETS—SHEET 7.
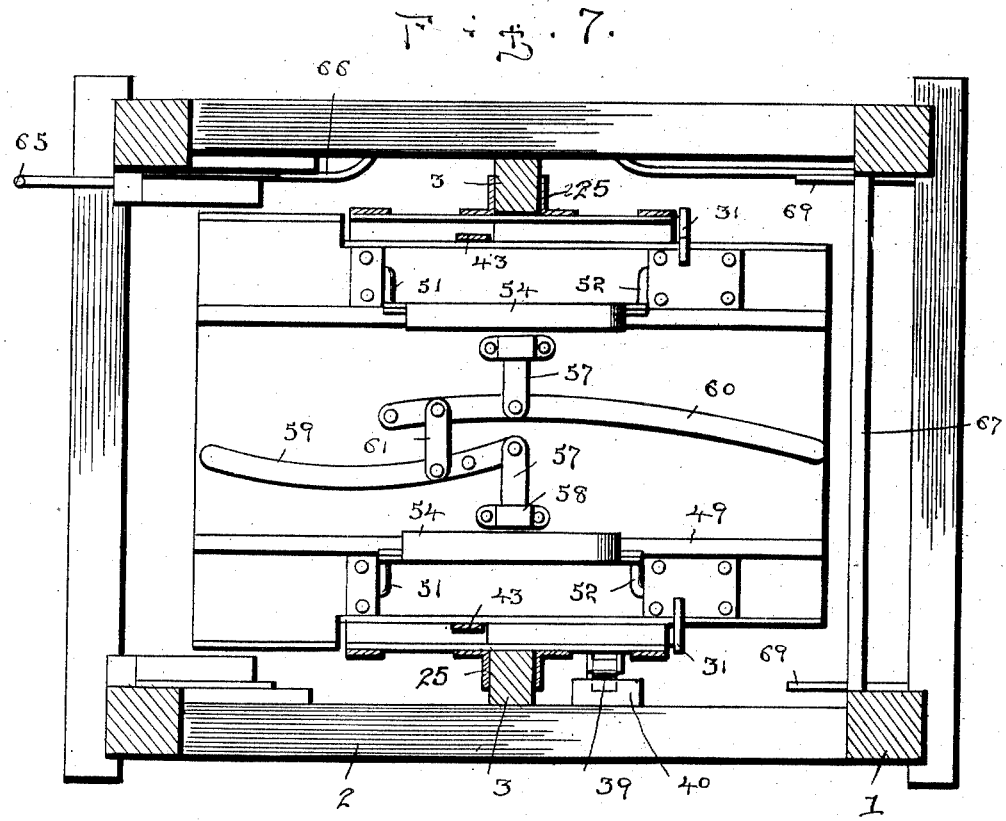
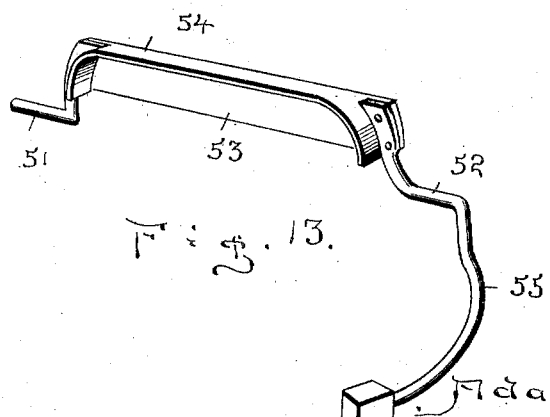
Witnesses
Inventor
Adam Kiddie.
By Victor J. Evans
Attorney No. 759,720. PATENTED MAY 10, 1904.
A. KIDDIE.
ELEVATOR.
APPLICATION FILED JAN. 30, 1903.
NO MODEL. 8 SHEETS—SHEET 8.
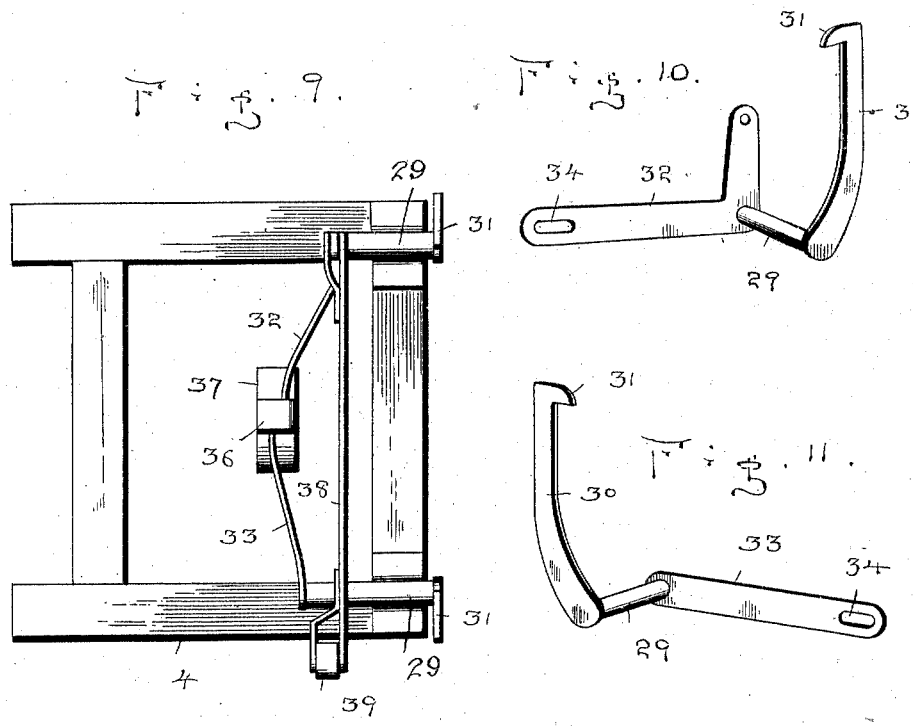
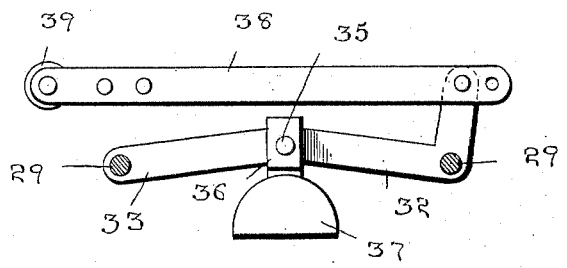
Witnesses
T. W. Riley.
Herbert D. Lawson.
Inventor
Adam Kiddie.
By Victor J. Evans
Attorney No. 759,720. Patented May 10, 1904.

UNITED STATES PATENT OFFICE.

ADAM KIDDIE, OF TILDEN, ILLINOIS, ASSIGNOR OF ONE-HALF TO GEORGE WILLIAM KIMBALL, OF TILDEN, ILLINOIS.

ELEVATOR.

SPECIFICATION forming part of Letters Patent No. 759,720, dated May 10, 1904.

Application filed January 30, 1903. Serial No. 141,187. (No model.)

*To all whom it may concern:*

Be it known that I, ADAM KIDDIE, a citizen of the United States, residing at Tilden, in the county of Randolph and State of Illinois, have invented new and useful Improvements in Elevators, of which the following is a specification.

My invention relates to new and useful improvements in elevators especially adapted for use in mines; and its object is to provide a car of novel construction the platform of which is provided with mechanism whereby the same may be tilted automatically at a desired point.

A further object is to provide means upon the platform for holding a railway-car in position thereon during the dumping process.

With the above and other objects in view the invention consists in the novel construction and combination of parts hereinafter more fully described and claimed, and illustrated in the accompanying drawings, showing the preferred form of my invention, and in which—

Figure 1 is a perspective view showing the car of my improved elevator in dumping position within the elevator-shaft, a railway-car being shown in position upon the platform. Fig. 2 is a side elevation of the car in dumping position, one side of the elevator-shaft being removed. Fig. 3 is a side elevation showing the elevator at the bottom of the shaft and also showing the chute in lowered position. Fig. 4 is a central vertical longitudinal section through the elevator-car, showing the platform in normal position. Fig. 5 is a rear elevation of the car. Fig. 6 is a central vertical transverse section therethrough. Fig. 7 is a horizontal section through the elevator-shaft and the car in position therein, the platform of said car being shown in plan view. Fig. 8 is an inner elevation of one of the corner-posts of the elevator-shaft and showing the trip-plates and one end of the mechanism for operating the car-supporting strip. Fig. 9 is a plan view of the bottom of the frame of the car and showing the position of the platform-locking device thereon. Figs. 10 and 11 are detail views of the platform-locking arms and the levers connected therewith. Fig. 12 is an elevation of the operating mechanism of the locking-arms. Fig. 13 is a detail view of one of the locking-blocks employed upon the platform for securing a railway-car thereto, and Fig. 14 is a detail view of one of the dogs of the safety attachment.

Referring to the figures by numerals of reference, 1 1 are the corner-uprights of the elevator-shaft, and these are adapted to be connected together by braces 2, arranged at desired points therebetween. Vertical guide-rails 3 are secured to the sides of the elevator-shaft, and between these is mounted the elevator-car. This car comprises a bottom frame 4, which is connected, by means of side strips 5, with cross-beams 6. Straps 7 are mounted upon the upper and lower surfaces of these cross-strips, and slidably mounted therein is a pin 8, which extends through a plate 9, connected at opposite ends to rods 10 and having, preferably, coiled springs 11 thereon, which bear upon the lower strap 7 and serve to hold said plate normally removed from the strap. The upper end of pin 8 is connected in any suitable manner to the hoisting-cable 12, and arms 13 extend laterally from this pin and are connected, by means of links 14, with the inner ends of dogs 15. These dogs are fulcrumed between brackets 16, secured to the cross-beam 6, and the outer ends thereof are preferably toothed, as shown at 17, and project through slots 18, whereby said dogs are permitted to contact with the inner surfaces of the guide-rails 3. The rods 10, which are fulcrumed to the ends of plate 9, extend beyond the sides of the car and are provided at their ends with arms 19, connected to dogs 21 substantially similar in construction to dog 15 and arranged at opposite sides of the guide-rails 3. It is therefore obvious that when pin 8 is drawn upward the plate 9 will be carried therewith and dogs 21 will be swung out of contact with the guide-rails. At the same time links 14 will pull upward upon the inner ends of dogs 15 and withdraw their outer ends 17 out of contact with the rails. It will thus be seen that should the upward pressure upon the pin cease at any time, as when the hoisting-cable 12 breaks or becomes slack, the coiled springs 11 will promptly throw plate 9 downward and carry the pin therewith, and the dogs will be forced into contact with the guide-rails and prevent the downward movement of the car. I preferably mount bow-springs 22 upon the plate 9, with the ends thereof contacting with cross-beams 6. These springs serve to assist the springs 11 in pressing the plate 9 downward promptly when pressure thereon is released. Chains 23 may be provided to connect the head 24 of pin 8 with the cross-beams 6, so that in the event of the breaking of connection between said pin and the plate 9 the chains will prevent the parting of the cable from the car. Guide-strips 25 are arranged upon the outer faces of hangers 5 and are adapted to bear upon opposite sides of the guide-rails 3. Slots 26 may be formed within said side rails to permit the side dogs 21 to project therethrough into contact with the guide-rails. The cage is preferably provided with a roof formed of sheet metal or other desired material and comprising a central V-shaped section 27, extending from front to rear thereof and having members 28 hinged to the edges thereof and extending over the top of the car. By raising these members 28 very long timbers may be placed in the car from the top or extremely heavy articles may be lowered thereinto. The inclined top also serves to direct to the sides of the shaft any articles which may fall thereinto, and persons at the bottom of the shaft will thus be less liable to injury resulting from falling articles.

Journaled upon the rear end of the bottom frame 4, at each side thereof, is a short longitudinally-extending shaft 29, from which projects an upwardly-extending arm 30, having an inwardly-projecting lug 31 at the end thereof provided with an upward beveled edge. One of the shafts is connected to a bell-crank lever 32, having a slot in one end thereof, while the other has a slotted arm 33 extending therefrom, and the two slots 34, formed within the bell-crank lever and the arm 33, receive a pin 35, extending through a hanger 36, having a weight 37 thereon. This weight serves to hold the arms 30 normally swung toward each other. A rod 38, having a friction-roller 39 at one end thereof, is connected at its other end to the bell-crank lever 32. This rod is guided within a slot formed in one side of the elevator-car, and the friction-roller projects therethrough and is adapted to contact with an operating-rail 40, secured within the elevator-shaft and extending upward from a point below the place at which the dumping portion of the car is to be operated. The lower portion of this operating-rail is beveled, as shown at 41, so that the roller 39 and the rod 38, connected therewith, will be gradually moved longitudinally when said roller comes in contact with the rail. This movement of the rod and roller will, as is obvious, swing the bell-crank lever 32 upon its fulcrum and raise the weight 37 and at the same time swing arms 30 outward from each other. The arms 30 when in their inner positions project over opposite sides of the platform 42 of the elevator-car. The sides of this platform are pivoted at points between their ends to the lower ends of hangers 43, depending from a shaft 44, which is secured within the hangers 5 of the car at a point adjacent to the cross-beams 6. Rollers 45 project from the sides of the car at points in rear of the hangers and are mounted between parallel curved guide-rails 46, which are fastened to the inner faces of the hangers 5. A shaft 47 is mounted within the forward end of platform 42, and journaled upon the ends of this shaft at the sides of the platform are rollers 48. Rails 49 extend from front to rear of the platform, and each is provided at opposite sides of the center thereof with depressions 50, which are spaced apart a sufficient distance to permit the wheels of a railway-car to rest therein when the car is in position upon the platform. Adjacent to the outer side of each rail 49 are journaled two crank-shafts 51 and 52, respectively, which are connected to opposite ends of a chock-block, which is preferably formed of a strip 53, having an inwardly-extending flange 54 at the top and ends thereof. A weighted arm 55 is connected to each crank-shaft 52 and extends through the platform, and these weights serve to hold the chock-blocks normally pressed toward each other except when the car of the elevator is at the bottom of the shaft, when the weights rest upon and are held against the bottom of the platform by a guide-block 56, the upper surface of which is concaved, as clearly illustrated in Fig. 1. These chock-blocks are adapted to normally extend over the wheels of the railway-car when the same are in position upon the platform and will prevent them from becoming displaced during the operation of dumping. If desired, however, an additional locking device may be employed for the railway-car. I have illustrated the same in Fig. 7. By reference thereto it will be seen that bolts 57 are mounted within guide-brackets 58, and one of them is fastened to the inner end of a longitudinally-extending lever 59, while the other is connected to another similar lever 60 at a point between the ends thereof. Lever 60 is fulcrumed at its inner end and is connected, by means of a link 61, to lever 59, and the fulcrum of said lever 59 is located at a point between the bolt 57, connected therewith and the link. It will be seen that when either of the levers 59 and 60 is swung outward the two bolts will be moved into position over rails 49 at points between the depressions 50 therein.

A chute 62 is adapted to be located at any point where it may be desired to tilt the platform of the elevator-car, and secured to the inner surface of the corner-posts 1 at points adjacent to the inner end of the chute are tilting-plates 63, which are adapted to project into the paths of rollers 48, before referred to, and limit the upward movement thereof. These plates 63 are curved, and arranged directly under the same are holding-plates 64, which are adapted to support the platform after the same has been tilted in the manner hereinbefore described. A lever 65 is connected at a point between its ends to a holding-strip 70, which is pivotally mounted upon trunnions 68, extending into the corner-posts 1, these trunnions forming a fulcrum for the lever. A rod 66 is pivotally connected to the lower end of lever 65 and extends along the sides of the elevator-shaft and is pivoted at its rear end to one end of a holding-strip 67, which is similar to the strip 70 before referred to and is also pivotally mounted upon trunnions 68, extending into the corner-posts 1. Stops 69 project in rear of strip 67, and when lever 65 is pressed inward strip 67 will, as is obvious, be drawn backward upon the stop 69 and in position under the elevator-car, which has been drawn upward in the shaft. At the same time the strip 70 will be swung into position under the elevator-car and will be held by means of stops 71, provided therefor. These strips are preferably located at points directly under the inner end of chute 62 and are adapted to support the platform 42 in alinement with the inner end of said chute. It will of course be obvious that when the car is supported by these strips it will be impossible to move the same downward in the shaft. The chute 62 is adapted to be supported in a substantially horizontal position by means of standards 72; but, if desired, these standards can be swung inward, as illustrated in Fig. 3, and the material dumped thereon will, as is obvious, slide away from the shaft. If desired, however, said material can be directed inward toward the shaft through an aperture 73, formed transversely of the chute. In order to secure this result, a plate 74, which normally closes said aperture and is adapted to be held in position thereover by a button 75, is raised in position at right angles to the bottom of the chute, as shown in Fig. 3, and is supported in such position by an arm 76, which extends through the aperture 73 and is provided with a lateral extension 77, adapted to bear upon the lower surface of the chute. The forward edge of plate 74 is hinged or otherwise secured to the adjacent edge of the aperture 73.

The opening in the elevator-shaft directly above the inner end of chute 62 is adapted to be normally closed by a vertically-movable gate 78, which is mounted on guide-rails 79. Arms 80 extend forward from the top of the elevator-car and are adapted when said top reaches the lower end of the gate to contact with said gate and raise it therewith. When the car is lowered within the shaft, the gate will travel downward therewith upon its guide-rails 79 until the opening within the shaft above the chute is closed thereby.

A bracket 81 is secured to the beam 82, which extends across the top of the discharge-opening in the elevator-shaft, and pivoted within this bracket is a weighted arm 83, having a hooked lower end 84, which is adapted to lie normally in the path of a hooked strap 85, secured to the tail-board 86 of a railway-car. This board is preferably connected to the sides of the car by means of side bars 87, which are pivoted thereto. A stop 88 is arranged in rear of bracket 81 and serves to limit the inward movement of the weighted arm 83.

A loaded car 89 or other receptacle is adapted to be moved onto the rails 49 when the elevator-car is at its lowest position in the elevator-shaft, and the wheels of the car will become seated within the depressed portions of the rails. Bolts 57 can then be moved into position over the rails 49 and between the wheels of the car, and the car is thus held firmly in position upon the rails. When the hoisting-cable 12 is drawn upward, the dogs 15 and 21 will, as before described, be removed from contact with the guide-rails 3 and the elevator-car will be carried upward with said cable. As soon as the car is removed from guide-block 56, the weighted arms 55 will swing the crank-shafts 51 and 52 so as to bring the chock-blocks in position over the outer faces of the wheels of the railway-car. Said car is thus held firmly bound upon the rails 49 and cannot be moved in any direction in relation thereto. As the elevator-car continues to travel upward, the roller 39 is brought into contact with the beveled end of operating-rail 40 and is gradually forced to one side, thereby imparting longitudinal movement to the rod 38 and causing arms 30 to move outward and away from the sides of the platform 42. This movement of the arms 30 does not occur until just prior to the arrival of the platform of the car into position in alinement with the inner end of chute 62. As soon as the platform comes into said position the rollers 48 thereon come into contact with tilting-plates 63, and as the forward end of the platform cannot, therefore, move upward any farther the rollers 42, adjacent to the rear end thereof, will travel upward between the curved guide-rails 46, and thereby bring the platform into an inclined position. The platform will be supported in this position by the holding-plates 46, upon which the rollers 48 are guided by the tilting-plates 63. Immediately prior to the tilting of the platform the hooked strap 85 is brought into contact with the end 84 of weighted arm 83 and forces the same outward until the hooked end of said strap has passed the end 84. Said hooked ends are then promptly placed into engagement with each other by reason of the fact that the weighted arm 83 will swing the end 84 inward as it is passed by the hooked strap. Therefore when the platform is tilted the tail-board 86 of the railway-car is drawn upward from the end of said car by the arm 83, and the contents of the car are permitted to fall outward upon the chute 62. As before described, the gate 78 is raised when the car is brought into position at the discharge-opening of the elevator-shaft. When the elevator-car is lowered, the forward end of the platform 42 is held against downward movement, while the rollers 45 travel backward and downward between the guide-rails 46. This movement of the rollers 45 will gradually withdraw rollers 48 from over the holding-plates 64, and the tail-board 86 will be brought back into its proper position at the end of the car 89 and become automatically disengaged from the hooked end 84 of arm 83. As the car moves downward in the elevator-shaft the gate 78 is lowered into closing position, and the roller 39 as soon as it leaves the operating-rail 40 is moved outward by the weight 37, and arms 30 are then promptly moved toward each other and the lugs 31 thereon brought into position over the sides of the platform 42, thereby securely locking the same in horizontal position. When the car reaches the bottom of the shaft, the weighted arms 55, depending therefrom, are brought into contact with the concave edge of guide-block 56 and are forced upward, thereby swinging the chock-blocks outward and releasing the wheels of the railway-car. The bolts 57 can then be withdrawn from position over the rails 49, and the car can be removed from the rails.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In an elevator of the character described, the combination with hangers, and a car-bottom secured thereto; of a platform suspended above said bottom, a curved guide-rail upon one of the hangers and adapted to be engaged by and guide the platform, and means whereby the platform is automatically tilted during the upward movement thereof.

2. In an elevator of the character described, the combination with a car; of pivoted hangers mounted therein, a platform secured to, and movable with, the hangers, a curved guide-rail within the car and adapted to be engaged by the platform, and means for retarding the upward movement of one end of the platform, whereby the same is tilted and guided by the guide-rails.

3. In an elevator of the character described, the combination with a car having pivoted hangers mounted therein; of a platform mounted between the hangers, rollers at the sides thereof, guide-rails within the car and adapted to be engaged by and to guide said rollers, and tilting rollers at one end of the platform.

4. In an elevator of the character described, the combination with a car having pivoted hangers therein; of a tilting platform mounted between the hangers, guide-rails within the car, rollers upon the platform adapted to engage and be guided by said rails, whereby a swinging motion is imparted to the platform when tilted.

5. In an elevator of the character described, the combination with a car having pivoted hangers therein; of a tilting platform mounted between said hangers, a locking-arm within the car at one side of the platform, and means for holding said arm normally in engagement with the platform.

6. In an elevator of the character described, the combination with a car having pivoted hangers therein; of a tilting platform mounted between the hangers, locking-arms mounted between the car at opposite sides of the platform and normally engaging the same, and means for automatically releasing the arms from the platform during the movement of the car.

7. In an elevator of the character described, the combination with a car having a platform therein adapted to be tilted; of shafts journaled upon the car at opposite sides of the platform, locking-arms to the shafts, a slotted arm to one of the shafts, a slotted bell-crank lever upon the other shaft, a weighted connection between the arm and lever, and a laterally-extending operating-rod connected to the lever and projecting from the car, whereby the locking-arms may be removed from engagement with the platform.

8. In an elevator of the character described, the combination with guide-rails; of a car slidably mounted thereon, a platform within the car and adapted to be tilted in relation thereto, arms journaled upon the car and adapted to normally hold the platform against movement in relation to the car, means for automatically releasing said arms from engagement with the platform during the movement of the car between the rails, a chock-block upon the platform, a weighted arm secured thereto and adapted to hold the same normally in an upright position, and a guide-block adjacent to the lower ends of the guide-rail and adapted to operate the weighted arm and the chock-block at the completion of the downward movement of the car.

9. In an elevator of the character described, the combination with guide-rails mounted within an elevator-shaft; of a car slidably mounted upon the rails, hangers pivoted within the car, a platform mounted between the hangers, rollers extending from the platform, parallel guide-rails within the car adapted to be engaged by and to guide said rollers, rollers extending from one end of the platform, tilting-plates within the shaft and in the path of said end rollers, whereby the platform is adapted to be tilted and moved outward from the car during the hoisting thereof.

10. In an elevator of the character described, the combination with a car having a platform mounted therein and adapted to be tilted in relation thereto; of means within the car for guiding the platform upward therefrom when tilted, and a weighted locking device adapted to overlap the edges of and normally hold the platform against movement in relation to the car.

11. In an elevator of the character described, the combination with a car having a platform therein adapted to be tilted; of connected weighted arms pivoted to the car and normally overlapping and holding the platform whereby the same is locked against movement in relation to the car, rails upon the car having depressions therein, chock-blocks adjacent the rails, inwardly-curved weighted arms connected to the blocks and adapted to hold the same normally in upright positions, and a guide-block for automatically swinging said arms together and imparting lateral movement to the blocks in opposite directions.

In testimony whereof I affix my signature in presence of two witnesses.

ADAM KIDDIE.

Witnesses:
CHAS. E. BARBER,
THOS. G. AITKEN.